United States Patent [19]
Moriwaki et al.

[11] Patent Number: 5,983,023
[45] Date of Patent: Nov. 9, 1999

[54] MEMORY-CONTAINED PROCESSOR

[75] Inventors: Shohei Moriwaki; Shunichi Yoshida; Hideharu Toyomoto, all of Hyogo, Japan

[73] Assignee: Mitsubishi Denki Kabushiki Kaisha, Tokyo, Japan

[21] Appl. No.: 08/887,285

[22] Filed: Jul. 2, 1997

[30] Foreign Application Priority Data

Jan. 17, 1997 [JP] Japan ................................. 9-006217

[51] Int. Cl.[6] .................................................. G06F 15/78
[52] U.S. Cl. ............................ 395/800.32; 711/104
[58] Field of Search ................... 395/800.01, 800.32, 395/800.33; 711/104, 105, 118, 122

[56] References Cited

U.S. PATENT DOCUMENTS

| | | | |
|---|---|---|---|
| 5,561,783 | 10/1996 | Vanka | 395/468 |
| 5,603,009 | 2/1997 | Konishi | 395/492 |
| 5,673,422 | 9/1997 | Kawai | 395/519 |
| 5,767,865 | 6/1998 | Inoue | 345/519 |
| 5,835,442 | 11/1998 | Joseph | 365/230.08 |

FOREIGN PATENT DOCUMENTS

| | | |
|---|---|---|
| 6-314240 | 11/1994 | Japan . |
| 6-337815 | 12/1994 | Japan . |
| 7-169271 | 7/1995 | Japan . |
| 7-200404 | 8/1995 | Japan . |

*Primary Examiner*—Eric Coleman
*Attorney, Agent, or Firm*—McDermott, Will & Emery

[57] ABSTRACT

A processor containing a cache memory having its storage capacity enlarged while suppressing area increases is provided. The processor includes an SRAM (Static Random Access Memory) cache memory and a DRAM (Dynamic RAM) cache memory of a large storage capacity. The SRAM cache memory and the DRAM cache memory are coupled to the processor through a processor bus. The SRAM cache memory and the DRAM cache memory transfer data through an internal transfer bus provided separately from the processor bus and having a larger width.

16 Claims, 9 Drawing Sheets

MEMORY-CONTAINED PROCESSOR

BACKGROUND OF THE INVENTION

1. Field of the Invention

The present invention relates to a memory-contained processor having memories and a processor formed on the same chip, and more particularly to a memory-contained processor containing a cache memory with superior area efficiency.

2. Description of the Background Art

Processors such as microprocessor units (MPUs) or central processing units (CPUs) have come to operate at higher speed, for example at 100 MHz, or 200 MHz. On the other hand, dynamic random access memories (DRAMs) used as main memories, though much improved, still operate slower than processors. Such a difference in the speed of operation causes the processor to wait until necessary data is available. In order to improve system performance so that high speed data processing is performed with the minimum wait time, a high speed memory called a cache memory is placed between the main memory and the processor. The cache memory stores data frequently accessed by the processor.

Since the processing proceeds according to a program, it is accompanied by localization of an access region. Therefore, when the cache memory stores data requested by the processor (cache hit), it is highly likely that this cache memory stores data which is continuously accessed. If this data requested by the processor exists in the cache memory, data transfer is always performed between the processor and the cache memory. It can reduce the wait time of the processor, resulting in high speed processing. The main memory DRAM is accessed only when the data requested by the processor does not exist in the cache memory (cache miss).

By storing an appropriate number of cache blocks (each of which serves as a unit of data transfer in cache miss) of an appropriate size in the cache memory, the cache hit rate can be increased, the wait time of the processor can be shortened, and the high speed data processing is possible.

The cache hit rate can be increased by enlarging a storage capacity of the cache memory. A static random access memory (SRAM) is usually used as such cache memory.

FIG. 17 shows an example of the SRAM cell structure. In FIG. 17, the SRAM cell SMC includes a load element Z1 connected between a power supply node VCC and an internal storage node NA, a load element Z2 connected between power supply node VCC and an internal storage node NB, an n channel MOS transistor (insulated-gate type field-effect transistor) T1 connected between internal storage node NA and a ground node GND and having its gate connected to internal storage node NB, an n channel MOS transistor T2 connected between internal storage node NB and ground node GND and having its gate connected to internal storage node NA, an n channel MOS transistor T3 being conducted in response to a signal potential on a word line WL to electrically connect internal storage node NA to a bit line BL, an n channel MOS transistor T4 being conducted in response to the signal potential on word line WL to electrically connect internal storage node NB to a bit line/BL.

A row of SRAM cells SMCs are connected to word line WL. Bit lines BL and/BL transmit complementary data signals and they are arranged in a pair. A column of memory cells are connected to this bit line pair BL and /BL.

Load elements Z1 and Z2 have a function of pulling up storage node NA or NB to the level of power supply voltage VCC (the node and the voltage supplied thereto are designated by the same character) according to stored information, and they are formed by thin-film transistors or resistance elements.

MOS transistors T1 and T2 constitute a flip-flop and hold signal potentials at internal storage nodes NA and NB. When the signal potential on word line WL rises to an H level, MOS transistors T3 and T4 are conducted, connecting internal storage nodes NA and NB to bit lines BL and /BL, respectively. In this state, data reading or writing for this SRAM cell SMC is performed.

As shown in FIG. 17, SRAM cell SMC includes four MOS transistors, that is, MOS transistors T1 and T2 for storing data and MOS transistors T3 and T4 for accessing this SRAM cell SMC. This SRAM has the advantage of operating at high speed due to the transmission of complementary data signals and the static operation. However, it is disadvantageous in that the occupied area by one-bit memory cell SMC is large. As a result, when a cache memory is structured by using this SRAM cell SMC, the area occupied by this cache memory increases with the increase in the storage capacity of this cache memory. Especially, it is a big obstacle to one-chip implementation of a processor and a memory, which is a current trend, and to size reduction of a system.

FIG. 18 shows a structure of a DRAM cell. In FIG. 18, two DRAM cells DMCa and DMCb are shown. DRAM cell DMCa is arranged corresponding to a crossing of a word line WLa and bit line BL. DRAM cell DMCb is arranged corresponding to a crossing of a word line WLb and bit line /BL. Each one of DRAM cells DMCa and DMCb includes a capacitor C for storing information and an n channel MOS transistor Q being conducted in response to a signal potential of corresponding word line WL (WLa or WLb) to electrically connect capacitor C to a corresponding bit line BL or/BL.

In this DRAM also, a row of DRAM cells are connected to word lines WLa and WLb, respectively, and a column of memory cells are connected to bit line pair BL and /BL. One electrode node of capacitor C of these DRAM cells DMCa and DMCb is supplied with a constant cell plate voltage VCP. DRAM cells DMCa and DMCb each store information according to the amount of charges accumulated in the other electrode of this capacitor C. In reading memory cell data, the memory cell data is read to one of bit lines BL and /BL, and the other bit line supplies a reference potential for this memory cell data.

Each one of DRAM cells DMCa and DMCb is constituted by one MOS transistor and one capacitor C as shown in FIG. 18. Therefore, it includes fewer transistors than SRAM cell SMC shown in FIG. 17, and occupies approximately one fourth the area of SRAM cell SMC. Thus, this DRAM can implement a memory of a large storage capacity in a limited area.

However, in the DRAM which operates dynamically, it is necessary to precharge each signal line to a prescribed potential, and it cannot operate at higher speed than SRAM. Therefore, if the DRAM is simply used as a cache memory, it is difficult to implement a high speed cache memory.

SUMMARY OF THE INVENTION

An object of the present invention is to provide a memory-contained processor containing a cache system which can reduce a penalty in cache miss without increasing the chip area.

A memory-contained processor in accordance with the present invention includes: an operational processor performing operational processing according to received data and instructions; a first memory storing information including the data/instructions for the operational processor; a second memory operating slower than the first memory and having a larger storage capacity and fewer one-bit memory cell transistors than the first memory, for storing information for the operational processor; a bus interconnecting the operational processor, the first memory and the second memory; a transfer unit provided separately from the bus and having a larger bus width than the bus, for transferring information between the first memory and the second memory; a first controller determining if information which the operational processor requests to access is stored in the first memory, for transferring information between the operational processor and the first memory through the bus according to the determination; and a second controller activated according to the determination by the first controller that the information requested by the operational processor does not exist in the first memory and determining if the information exists in the second memory, for transferring information including the requested information between the first memory and the second memory through the transfer unit when the determination indicates the existence of the requested information in the second memory.

The first and the second memories constitute a hierarchical cache system. When there is a cache miss in the first memory while there is a cache hit in the second memory, information is transferred between the first and the second memories through the transfer unit. This transfer unit is wider than the bus connected to the operational processor. Therefore, it can collectively transfer a large amount of data, reducing a cache miss penalty (wait time) of the first memory.

Further, the second memory has fewer one-bit cell transistors than the first memory, and the second memory is integrated to a higher degree than the first memory. Therefore, the storage capacity of the second memory can be increased in a small occupied area. It can enlarge the storage capacity of the contained cache memory and equivalently increase the hit rate.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
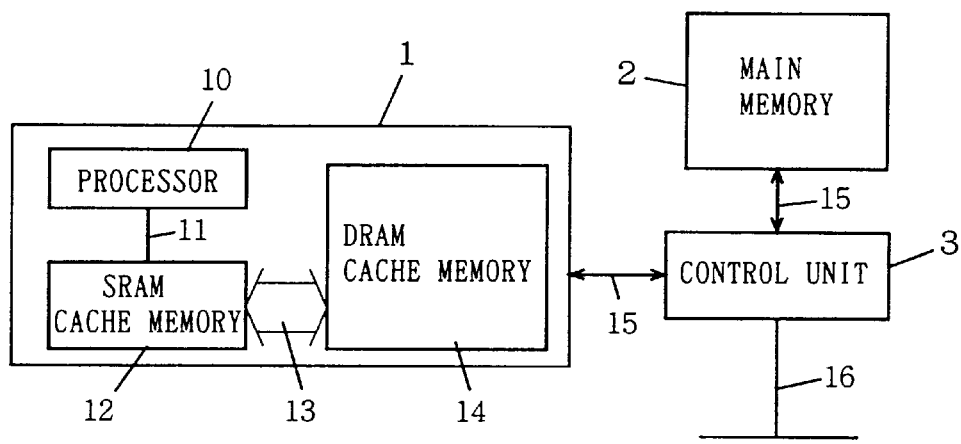
FIG. 1 schematically shows a structure of a memory-contained processor in accordance with the present invention and a system using the same.

FIG. 1 schematically shows a structure of a memory-contained processor in accordance with the present invention and a system using the same. In FIG. 1, the processing system includes a memory-contained processor 1, a main memory 2 constituted by a DRAM, and a control unit 3 for controlling data transfer between memory-contained processor 1 and main memory 2 and data transfer between circuitry, not shown, and memory-contained processor 1 and main memory 2.

Memory-contained processor 1 includes a processor 10 performing operational processing according to received instructions and data (hereinafter, referred to as information), an SRAM cache memory 12 as a first memory, coupled to processor 10 through a processor bus 11 and functioning as a primary cache for this processor 10, and a DRAM cache memory 14 as a second memory, coupled to SRAM cache memory 12 through a transfer bus section 13 so as to enable bi-directional transfer of information and functioning as a cache memory, that is, a secondary cache memory for this SRAM cache memory 12.

Control unit 3 is coupled to this memory-contained processor 1 and main memory 2 through a system bus 15. This control unit 3 is also coupled to a unit, not shown, (another processing device, logic or memory) through a local bus 16.

This memory-contained processor 1 is formed on one chip. Therefore, the width of processor bus 11 between SRAM cache memory 12 and processor 10 is not influenced by the number of data input output terminals of the SRAM cache memory and it can be set to a desired width. If SRAM cache memory 12 and processor 10 are formed on separate chips, they are interconnected by a wire on the board on which they are mounted. In this case, a load of the wire on the board is heavier than that of processor bus 11 formed within the chip. Therefore, by forming processor 10 and SRAM cache memory 12 on the same chip, a large amount of information can be transferred at high speed between processor 10 and SRAM cache memory 12.

DRAM cache memory 14 is coupled to SRAM cache memory 12 through transfer bus section 13 as transfer means. This transfer bus section 13 is provided separately from processor bus 11, and its bus width is made substantially larger than that of processor bus 11. Therefore, if information requested by processor 10 does not exist in SRAM cache memory 12, it can be transferred from DRAM cache memory 14 to SRAM cache memory 12 through this transfer bus section 13 with the larger bus width. In this case also, transfer bus section 13 is an internal bus on a chip, it can transfer data at high speed, and its bus width can be set desirably without being influenced by data input/output pin terminals of DRAM cache memory 14. Thus, information can be transferred at high speed to SRAM cache memory 12 even in cache miss in SRAM cache memory 12, reducing the cache miss penalty (wait time of processor 10).

Figure 18:
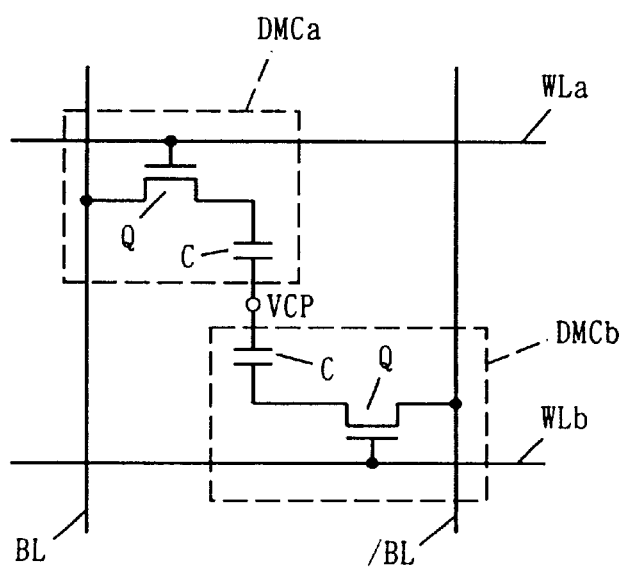
FIG. 18 schematically shows a structure of a conventional DRAM cell.

For the DRAM cell contained in DRAM cache memory 14, as shown in FIG. 18, a one-bit memory cell is constituted by one transistor and one capacitor, this one-bit DRAM cell occupies a smaller area, and DRAM cache memory 14 is integrated to a higher degree than SRAM cache memory 12. Therefore, a cache memory having a necessary, for example 2M byte, storage capacity can be implemented in this memory-contained processor 1 without increasing the occupied area of a chip.

Figure 2:
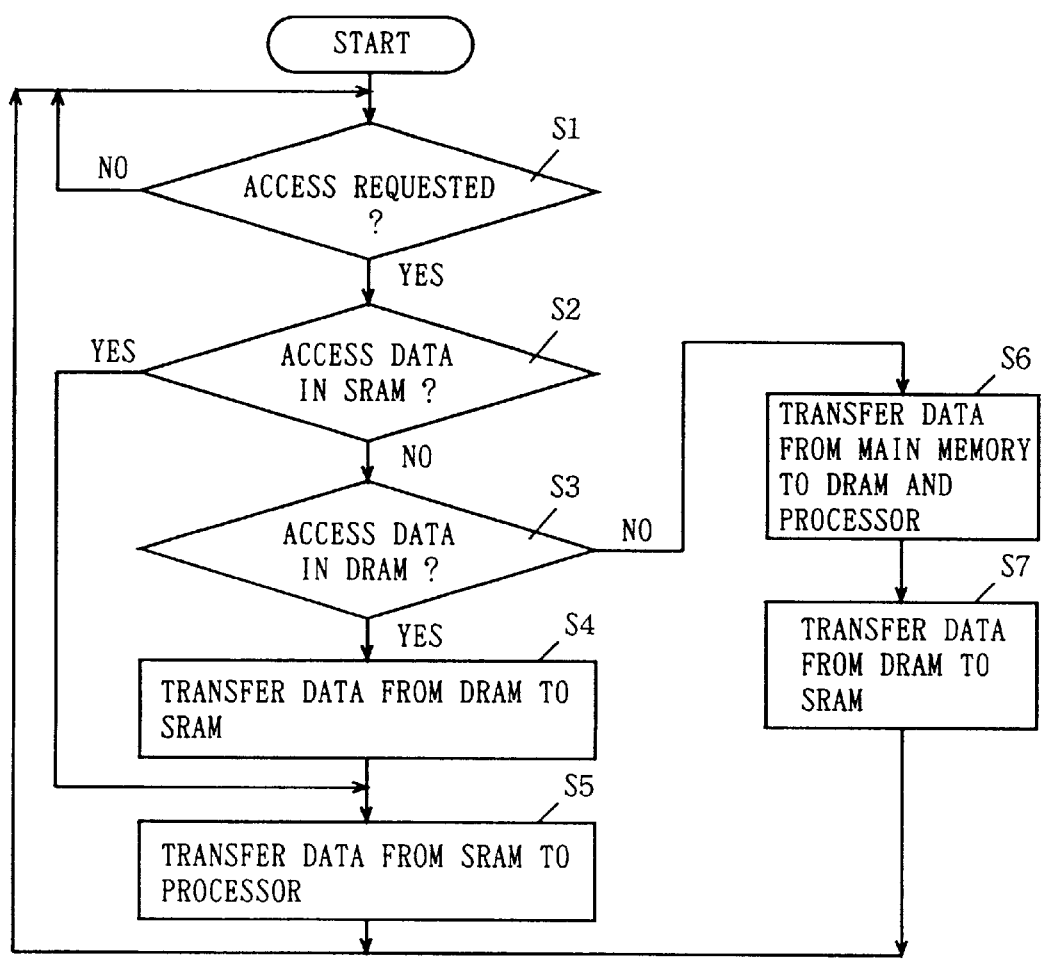
FIG. 2 is a flow chart showing operation of the memory-contained processor in accordance with the present invention.

FIG. 2 is a flow chart describing a data transfer operation of the memory-contained processor shown in FIG. 1. In FIG. 2, the operation of transferring data, which processor 10 requests to access, to processor 10, that is, the data reading operation from a cache memory will be described. Although the description below is of data transfer, that is, the data to be operationally processed, it also applies to transfer of an instruction.

First, a controller, not shown, determines if processor 10 has made an access request to SRAM cache memory 12 (step S1).

If this access request has been made, a determination is made if the data which processor 10 requests to access exists in SRAM cache memory 12 (step S2). If it does, the process proceeds to step S5, and the requested data is transferred from SRAM cache memory 12 to this processor 10 through processor bus 11.

On the other hand, if the requested data does not exist in SRAM cache memory 12, a determination is made if the requested data exists in DRAM cache memory 14 (step S3). If it does, a data block containing this requested data is transferred from DRAM cache memory 14 to SRAM cache memory 12 through transfer bus section 13 (step S4).

Here, an operation mode is assumed in which what is called "a copy back operation" is not performed and data is not transferred from SRAM cache memory to DRAM cache memory 14 in cache miss in SRAM cache memory 12. This operation mode assumes "a write through operation" in which data written to SRAM cache memory 12 is written to a corresponding location of DRAM cache memory 14. In copying back, data is transferred from SRAM cache memory 12 to DRAM cache memory 14 before data transfer from DRAM cache memory 14 to SRAM cache memory 12.

When the necessary data is transferred to SRAM cache memory 12 in step S4, the access-requested data is transferred from SRAM cache memory 12 to processor 10 through processor bus 11 (step S5).

In step S3, if the data which processor 10 requests to access does not exist in DRAM cache memory 14 either, memory-contained processor 1 supplies an access request and address information to control unit 3. When control units 3 receives the access request, it reads necessary data from main memory 2 according to the address information and transfers the data to memory-contained processor 1 through system bus 15. In memory-contained processor 1, the data transferred from main memory 2 through system bus 15 under the control of control unit 3 is stored in DRAM cache memory 14, and the necessary data is also transferred to processor 11 through a processor bus (not shown)(step S6).

By transferring the necessary data to processor 10 simultaneously with the data transfer operation to this DRAM cache memory 14, the wait time of processor 10 is shortened.

When a data block constituting one unit is completely transferred from main memory 2 to DRAM cache memory 14, data is transferred from this DRAM cache memory 14 to SRAM cache memory 12 (step S7). Thus, SRAM cache memory 12 stores the data block (SRAM cache block) containing the data which processor 10 requests to access, increasing the cache hit rate for the next access.

Figure 3:
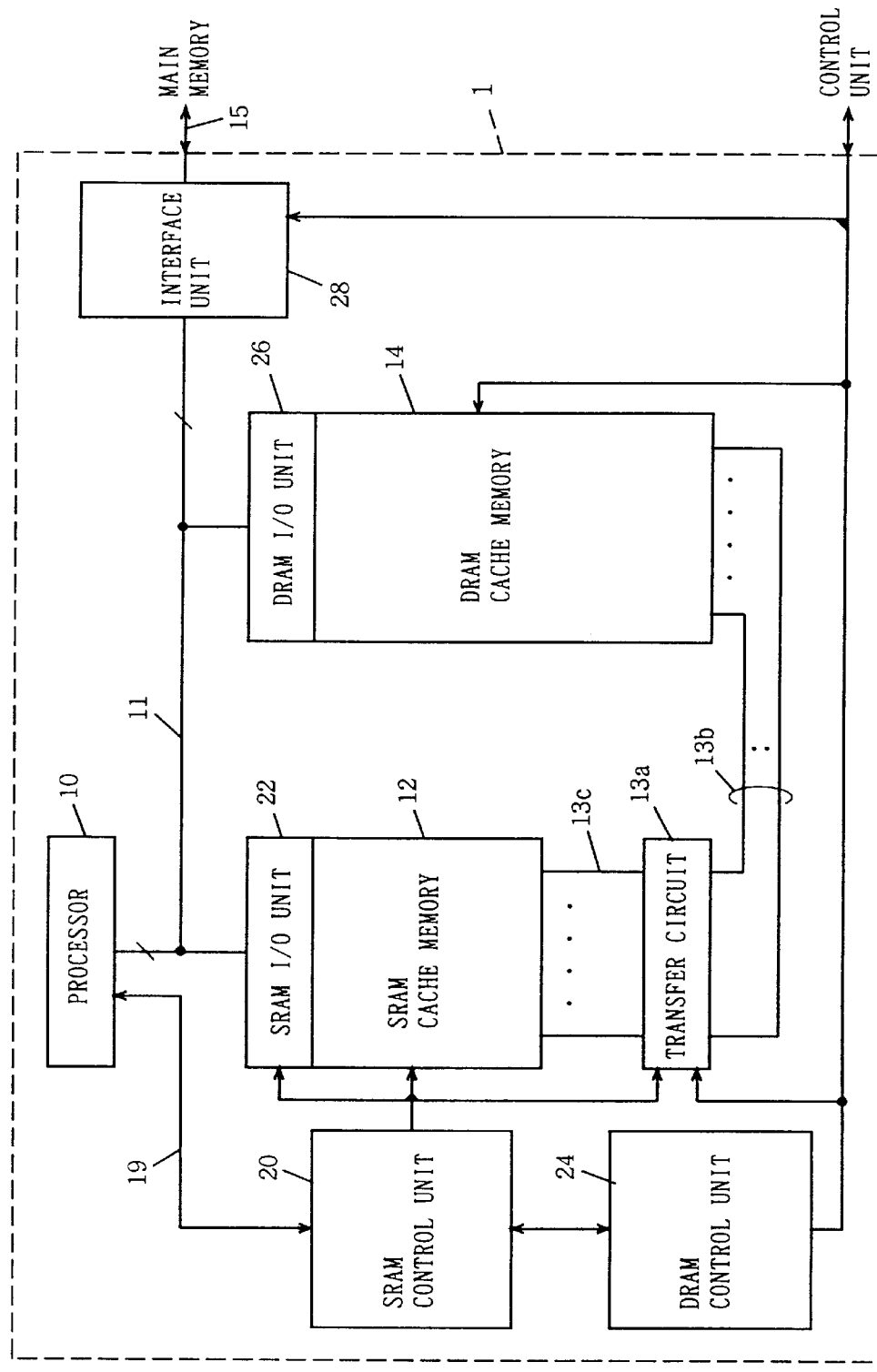
FIG. 3 more specifically shows the structure of the memory-contained processor in accordance with the present invention.

FIG. 3 schematically shows a more detailed structure of memory-contained processor 1 shown in FIG. 1. In FIG. 3, memory-contained processor 1 includes an SRAM I/O unit 22 for transferring data between processor 10 and SRAM cache memory 12 through processor bus 11, and an interface unit 28 coupled through processor bus 11 to processor 10 and DRAM I/O unit 26 for transferring data between DRAM cache memory 14 and the external main memory, and coupled through system bus 15 to the main memory and so on outside of memory-contained processor 1, for transferring information between processor bus 11 and system bus 15.

DRAM I/O unit 26 is coupled to processor 10 and interface unit 28 through processor bus 11. Interface unit 28 transfers data to and from DRAM I/O unit 26. SRAM I/O unit 22 transfers data to and from processor 10 only. In short, in the structure of the memory-contained processor 1, only DRAM cache memory 14 can directly be accessed from the outside.

Interface unit 28 may have a function of changing bus bit width when processor bus 11 and external system bus 15 have different bus widths. However, system bus 15 and processor bus 11 are assumed to have the same bus width in the description below.

Memory-contained processor 1 further includes: an SRAM control unit 20 coupled to processor 10 through a control/address bus 19 and controlling access to SRAM cache memory 12 according to a received address when access is requested by processor 10; and a DRAM control unit 24 activated when cache miss is determined in this SRAM control unit 20 and controlling data transfer from DRAM cache memory 14 to SRAM cache memory 12 and/or data transfer between the external main memory and DRAM cache memory 14. SRAM cache memory 12 and DRAM cache memory 14 are coupled through transfer circuit 13a and internal transfer buses 13b and 13c which constitute transfer bus section 13.

When SRAM cache memory 12 contains memory cell data designated by an address signal supplied from processor 10 through control/address bus 19, SRAM control unit 20 accesses cache memory 12 to read addressed SRAM cell data and provides the data to processor 10 through SRAM I/O unit 22 and processor bus 11 (cache hit).

When SRAM cache memory 12 does not contain memory cell data designated by an address signal supplied from processor 10 (SRAM cache miss), SRAM control unit 20 causes processor 10 to enter the wait state through control/ address bus 19 due to the cache miss. At this time, SRAM control unit 20 activates DRAM control unit 24. Further, SRAM control unit 20 drives SRAM cells of a cache block size receiving transferred data, into the selected state at a prescribed timing in SRAM cache memory 12 so that they receive a transferred data block containing the memory cell data which processor 10 requests to access.

DRAM control unit 24 is activated according to a cache miss indication from SRAM control unit 20, and it receives an address supplied from processor 10 through SRAM control unit 20 and determines if the memory cell data which processor 10 requests to access exists in DRAM cache memory 14. If the data exists in DRAM cache memory 14, DRAM control unit 24 informs SRAM control unit 20 of DRAM cache hit. In accordance with the DRAM cache hit indication from DRAM control unit 24, SRAM control unit 20 drives the region receiving transferred data of SRAM cache memory 12 to the selected state, and couples these selected SRAM cells to internal data bus 13c. In accordance with the address signal supplied from processor 10, DRAM control unit 24 selects the block containing the requested data and reads it onto internal data bus 13b, and activates transfer circuit 13a.

This transfer circuit 13a includes a DRAM transfer circuit section coupled to internal transfer bus 13b and an SRAM transfer circuit section coupled to internal transfer bus 13c, as described later. By separating the transfer circuit into the DRAM section and the SRAM section, their transfer operation can be implemented asynchronously (in a hand shaking manner) by DRAM control unit 24 and SRAM control unit 20, enabling accurate transfer of the selected memory cell data.

In short, in response to an activation instruction of the DRAM transfer circuit section contained in this transfer circuit 13a from DRAM control unit 24, SRAM control unit 20 activates the SRAM transfer circuit section contained in transfer circuit 13a and the data which has been transferred on internal bus 13b are transferred to internal transfer bus 13c. By this time, in SRAM cache memory 12, corresponding memory cells have been driven to the selected state by SRAM control unit 20, and the data transferred on internal transfer bus 13c are written to each selected SRAM cell. At this time, SRAM control unit 20 also activates SRAM I/O unit 22, selects corresponding data of SRAM cache memory 12 according to the address signal from processor 10, and supplies the data to processor 10 through processor bus 11.

When DRAM cache memory 14 does not contain the memory cell data which processor 10 requests to access, DRAM control unit 24 informs the external control unit (control unit 3 of FIG. 1) of DRAM cache miss, drives a region receiving transferred data into the selected state, and activates DRAM I/O unit 26. Further, interface unit 28 is activated under the control of DRAM control unit 24 successively and it couples processor bus 11 to external system bus 15.

The externally provided control unit (see FIG. 1) accesses the main memory (see FIG. 1) according to the address signal supplied from DRAM control unit 24, successively reads out data of a corresponding region (data of the DRAM cache block) of this main memory 2 to system bus 15, and supplies the data to interface unit 28. Interface unit 28 successively supplies the data received through system bus 15 to DRAM I/O unit 26. DRAM I/O unit 26 successively transfers blocks of the transferred data to selected DRAM cells in DRAM cache memory 14.

Among the data supplied on processor bus 11 through interface unit 28, if the data which processor 10 requests to access reaches, the requested data is also supplied to processor 10 through processor bus 11. When data transfer of one DRAM cache block (corresponding to the bus width of transfer bus section 13) is completed in DRAM cache memory 14, DRAM control unit 24 activates DRAM transfer circuit section contained in transfer circuit 13a and causes transfer circuit 13a to obtain the data read to internal transfer bus 13b. Here, internal transfer bus 13b has the written data transferred thereon simultaneously with writing of the data from DRAM I/O unit 26 to DRAM cache memory 14. When DRAM control unit 24 activates the DRAM transfer circuit section contained in transfer circuit 13a, it informs SRAM control unit 20 of completion of data transfer. Responsively, SRAM control unit 20 activates the SRAM transfer circuit section of transfer circuit 13a and writes the data to SRAM cells of the corresponding SRAM cache block in SRAM cache memory 12.

Here, the external control unit may indicate this DRAM control unit 24 that transfer of necessary DRAM cache block data is completed when data is transferred from main memory to DRAM cache memory 14. Further, DRAM control unit 24 may count the number of data transferred on processor bus 11 through interface unit 28 and identify that a necessary number of data (all data of the DRAM cache block) have been transferred.

By adapting SRAM cache memory 12 and DRAM cache memory 14 to have two ports, respectively, as described above, data can be transferred at high speed between SRAM cache memory 12 and DRAM cache memory 14 through internal transfer buses 13b and 13c having wider bus widths than processor bus 11 and system bus 15.

Figure 4:
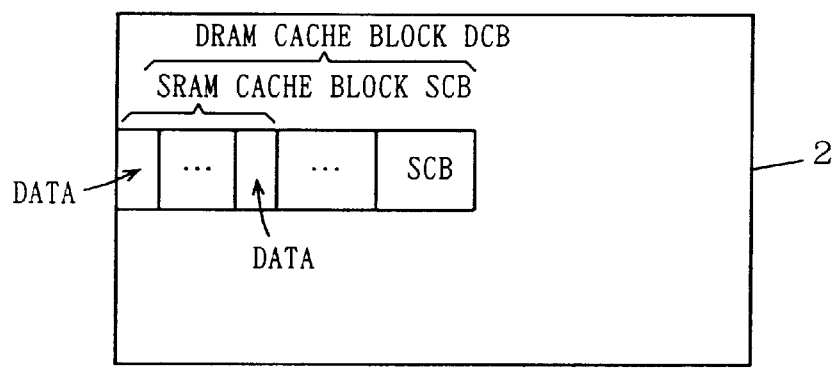
FIG. 4 schematically shows the hierarchical relation between cache blocks in the memory-contained processor in accordance with the present invention.

FIG. 4 schematically shows the correspondence of an address region in main memory 2 to the DRAM and SRAM cache blocks. As shown in FIG. 4, in main memory 2, the DRAM cache block DCB serving as a unit of determining DRAM cache hit/miss includes a plurality of SRAM cache blocks SCBs. In DRAM cache miss, data is transferred between main memory 2 and DRAM cache memory 14 with this DRAM cache block DCB used as a unit.

SRAM cache block SCB includes a plurality of data. In SRAM cache miss, data is transferred between the SRAM cache memory and the DRAM cache memory with SRAM cache block SCB used as a unit. SRAM cache hit/miss is determined on a basis of SRAM cache block SCB. Data is transferred to processor 10 through processor bus 11 (see FIG. 3).

Figure 5:
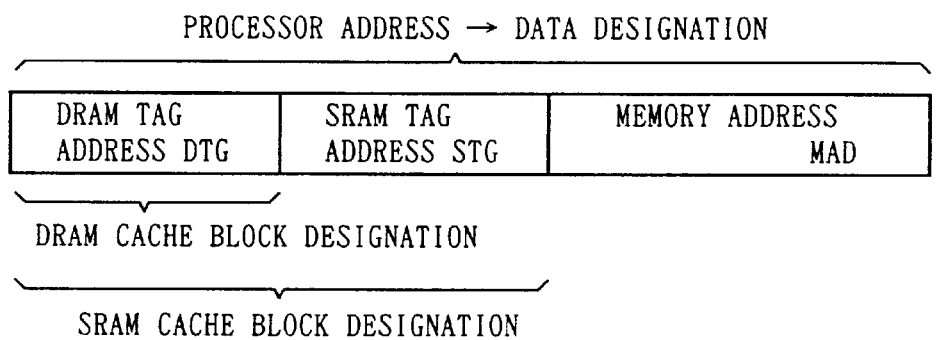
FIG. 5 schematically shows the correspondence of processor addresses in the memory-contained processor in accordance with the present invention to each cache block.

FIG. 5 shows the correspondence of a processor address to the DRAM cache block, the SRAM cache block and data. The processor address includes a DRAM tag address DTG, an SRAM tag address STG and a memory address MAD. DRAM tag address DTG, SRAM tag address STG and memory address MAD in combination designate one data. A set of DRAM tag address DTG and SRAM tag address STG designates the SRAM cache block. DRAM tag address DTG designates the DRAM cache block.

Figure 6:
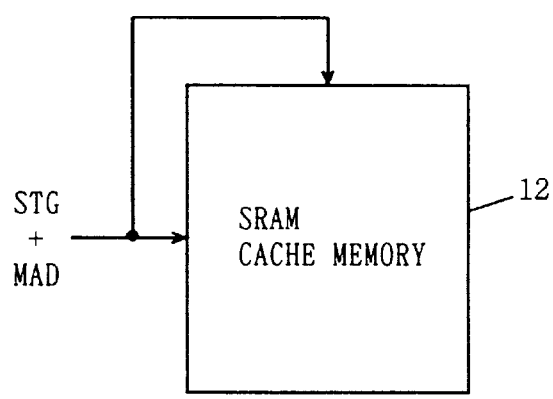
FIG. 6 schematically shows address signals supplied to an SRAM cache memory in SRAM cache hit.

FIG. 6 schematically shows addresses supplied to SRAM cache memory 12 at the time of SRAM cache hit. In SRAM cache hit, SRAM cache memory 12 contains data which processor 10 requests to access. In this case, SRAM tag address STG and memory address MAD are applied to SRAM cache memory 12, and the requested data is read out of SRAM cache block SCB which is hit. How SRAM tag address STG and memory address MAD are divided into row and column addresses in SRAM cache memory 12 varies according to a memory cell arrangement in SRAM cache memory 12. For example, if SRAM cache block SCB corresponds to a word line in SRAM cache memory 12, SRAM tag address STG is used as a row address and memory address MAD as a column address.

Figure 7:
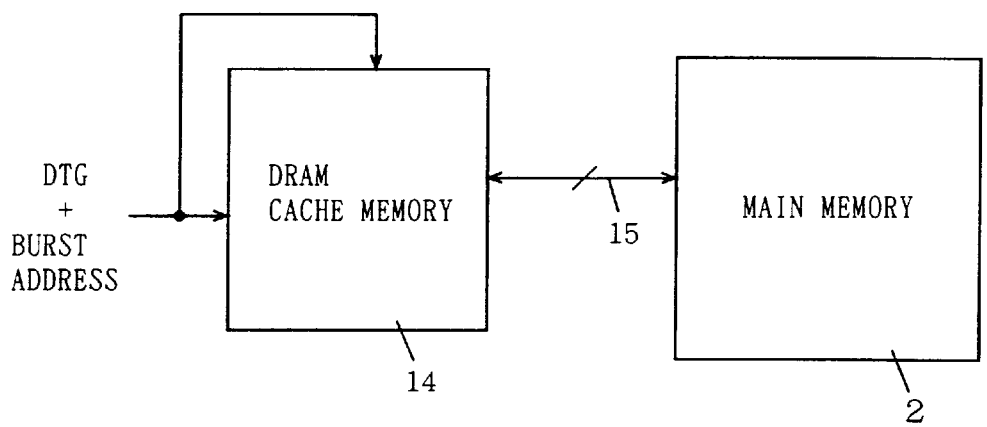
FIG. 7 schematically shows addresses supplied to a DRAM cache memory when data is transferred between the DRAM cache memory and a main memory.

FIG. 7 shows addresses applied to DRAM cache memory 14 at the time of SRAM cache miss and DRAM cache miss. As shown in FIG. 7, DRAM tag address DTG and a burst address are applied to DRAM cache memory 14 in this case. As described later, this burst address is generated from a burst address counter and successively incremented for every data transfer. Between main memory 2 and DRAM cache memory 14, data is transferred through system bus 15 (through processor bus 11 inside the processor). For access to this main memory 2, DRAM tag address DTG is applied to the external control unit. Using this DRAM tag address DTG as a head address, the external control unit selects a DRAM cell according to the burst address and successively transfers data of a DRAM cache block size.

If main memory 2 is a clock-synchronous dynamic random access memory (SDRAM) which writes/reads data synchronously with a clock signal, the control unit has only to apply DRAM tag address DTG to the main memory as a head address, because SDRAM contains a counter generating a burst address inside. Alternatively, DRAM tag address DTG and the burst address may be successively applied to the external control unit from the memory-contained processor.

Figure 8:
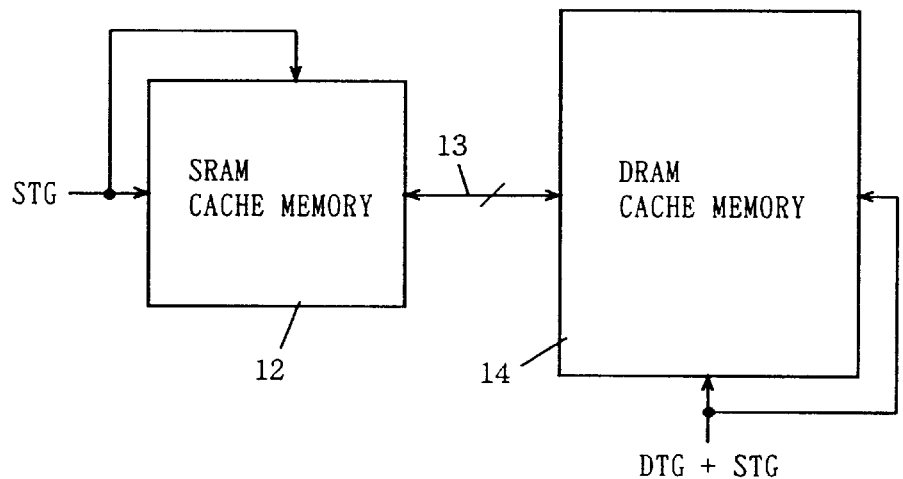
FIG. 8 schematically shows addresses supplied to each cache memory when data is transferred between the SRAM cache memory and the DRAM cache memory.

FIG. 8 shows addresses applied to SRAM cache memory 12 and DRAM cache memory 14 when data is transferred between these cache memories. In this case, SRAM tag address STG is applied to SRAM cache memory 12, and DRAM tag address DTG and SRAM tag address STG are applied to DRAM cache memory 14. From DRAM cache memory 14, data of SRAM cache block specified by SRAM tag address STG in the DRAM cache block is transferred through transfer bus section 13 (including transfer circuit 13a shown in FIG. 3).

Figure 9:
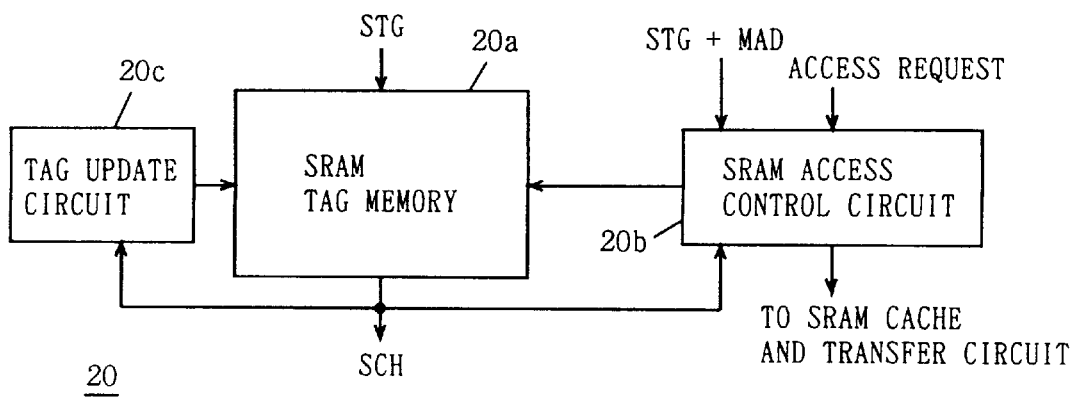
FIG. 9 schematically shows a structure of an SRAM control unit shown in FIG. 3.

FIG. 9 schematically shows a structure of SRAM control unit 20 shown in FIG. 3. In FIG. 9, SRAM control unit 20 includes an SRAM tag memory 20a storing tag addresses for respective SRAM cache blocks in SRAM cache memory 14, an SRAM access control circuit 20b receiving an access request from the processor and address signals STG and MAD, and activating SRAM tag memory 20a and carrying out necessary control when the access request is supplied, and a tag update circuit 20c updating the tag address of SRAM tag memory 20a in cache miss.

SRAM tag memory 20a compares this SRAM tag address STG applied from the processor with tag addresses stored, determines whether a coincident tag address is stored, and activates/inactivates SRAM cache hit indication signal SCH according to the determination. This SRAM tag memory 20a is constituted by a content addressable memory for example, and it determines coincidence/non-coincidence with its stored content using received SRAM tag address STG as retrieval data.

When SRAM cache hit indication signal SCH is active, SRAM access control circuit 20b accesses the SRAM cache memory according to received address signals STG and MAD, reads corresponding data, and supplies it to the processor. When SRAM cache hit indication signal SCH is inactive, that is, in SRAM cache miss, SRAM access control circuit 20b carries out necessary control of data transfer.

When this SRAM cache hit indication signal SCH is inactive, tag update circuit 20c replaces a tag address which is, for example, least recently used with received tag address STG, according to the LRU logic (Least Recently Used Logic).

Figure 10:
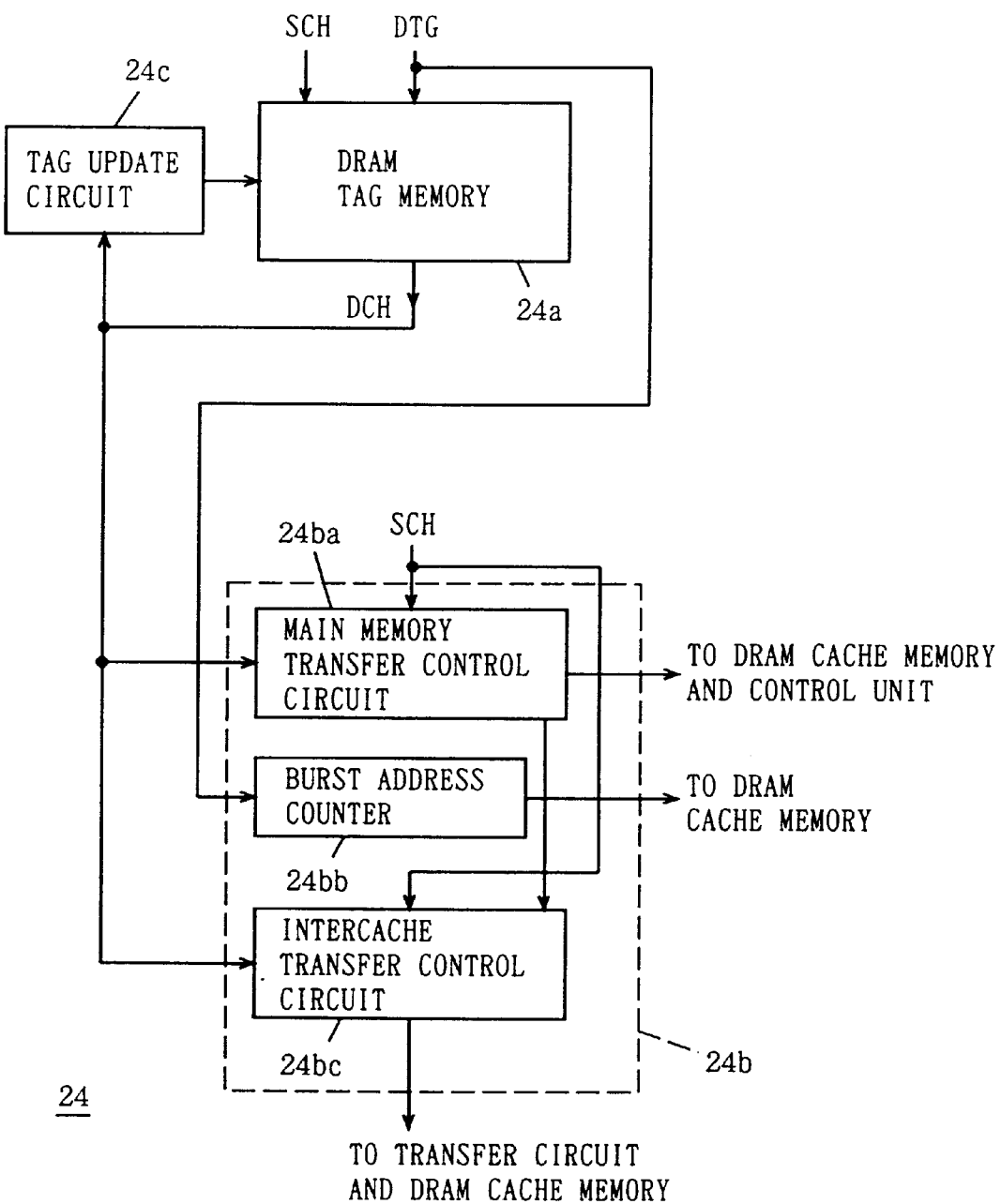
FIG. 10 schematically shows a structure of a DRAM control unit shown in FIG. 3.

FIG. 10 schematically shows a structure of DRAM control unit 24 shown in FIG. 3. In FIG. 10, DRAM control unit 24 includes a DRAM tag memory 24a storing each tag address of DRAM cache blocks stored in the DRAM cache memory and, when activated, detecting coincidence/non-coincidence between DRAM tag address DTG and the stored DRAM tag addresses, a transfer control circuit 24b carrying out necessary control of data transfer to and from the main memory or the SRAM cache memory according to DRAM cache hit indication signal DCH from DRAM tag memory 24a, and a tag update circuit 24c replacing the tag address in DRAM tag memory 24 with newly received DRAM tag address DTG when DRAM cache hit indication signal DCH from DRAM tag memory 24a is inactive.

DRAM tag memory 24a is activated in response to an activation signal, not shown, from the SRAM control unit (see FIG. 9), and it compares received DRAM tag address DTG with the stored DRAM tag addresses when SRAM cache hit indication signal SCH is inactive. This DRAM tag memory 24a is also constituted by a content addressable memory, and it performs a retrieval operation using received DRAM tag address DTG as retrieval data.

Transfer control circuit 24b includes: a main memory transfer control circuit 24ba for transferring data between the DRAM cache memory and the main memory, when activated; a burst address counter 24bb operating under the control of main memory transfer control circuit 24ba, counting for every data transfer using received DRAM tag address DTG as an initial value, and generating an address signal for the DRAM cache memory; and an intercache transfer control circuit 24bc for transferring data between the SRAM cache memory and the DRAM cache memory, when activated.

Main memory transfer control circuit 24ba controls data transfer between the DRAM cache memory and the interface unit through the DRAM I/O unit and a row/column selection operation in the DRAM cache memory, and supplies a control signal instructing the externally provided control unit to transfer data. An address of burst address counter 24bb is applied to the DRAM cache memory and used to select a row/column of the DRAM cache memory.

Figure 11:
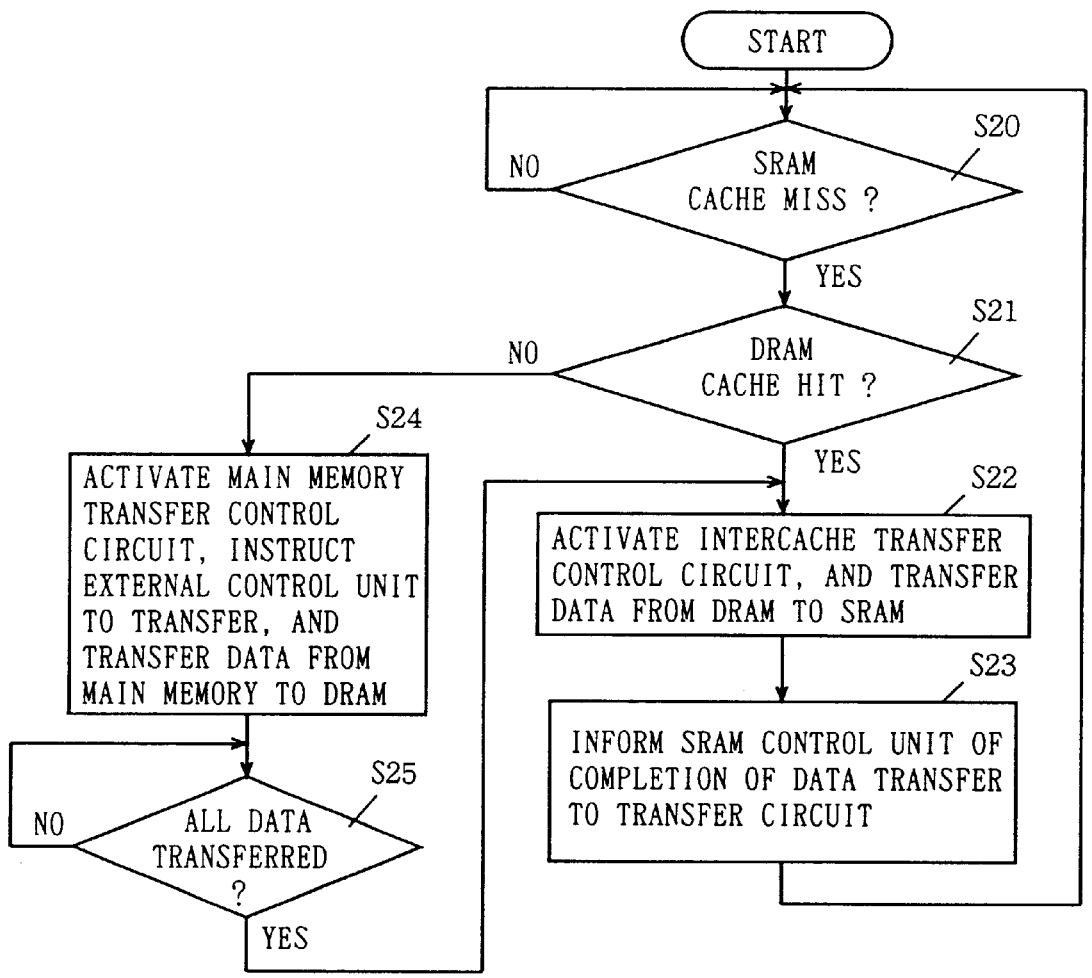
FIG. 11 is a flow chart describing operation of the DRAM control unit shown in FIG. 10.

Intercache transfer control circuit 24bc controls data transfer between the DRAM cache memory and the DRAM transfer circuit contained in the transfer bus section. Main memory transfer control circuit 24ba is activated under the control of the SRAM control unit through a line, not shown. Intercache transfer control circuit 24bc is activated at the time of SRAM cache miss and DRAM cache hit, and at the time of SRAM cache miss and DRAM cache miss. Now, operation of DRAM control unit 24 shown in FIG. 10 will be described with reference to a flow chart shown in FIG. 11.

First, a determination is made if DRAM transfer control circuit 24b and DRAM tag memory 24a have been informed of the occurrence of SRAM cache miss from the SRAM control unit (step S20). In FIG. 10, SRAM cache hit indication signal SCH is only shown as a signal for informing. When the processor requests an access, this SRAM cache hit indication signal SCH is enabled, set to a state indicating cache hit/miss, and supplied to DRAM control unit 24. If there is no access request from the processor, this cache hit indication signal SCH to DRAM control unit 24 is disabled, and it does not indicate SRAM cache hit/miss. Thus, this DRAM control unit is driven to the non-operational (inactive) state.

When SRAM cache miss occurs (cache hit indication signal SCH is inactive), DRAM tag memory 24a is activated, and it compares DRAM tag address DTG from the SRAM control unit or the processor with DRAM tag addresses stored (step S21).

If this received DRAM tag address DTG coincides with a tag address stored in DRAM tag memory 24a, DRAM cache hit indication signal DCH is activated, indicating that the DRAM cache memory contains the data to which the processor requests an access. In response to activation of DRAM cache hit indication signal DCH, intercache transfer control circuit 24bc (which has been enabled under the control of the SRAM control unit) is activated, allowing selection of a corresponding cache block in the DRAM cache memory, transfer of the selected cache block data to the internal transfer bus of the transfer bus section, and activation of the transfer circuit (step S22).

When data transfer from internal transfer bus 13b coupled to DRAM cache memory 14 to transfer circuit 13a (see FIG. 3) is completed, intercache transfer control circuit 24bc supplies SRAM control unit 20 with a signal indicating that the data of DRAM cache block has been transferred into transfer circuit 13a (step S23). Thereafter, SRAM access control circuit 20b shown in FIG. 9 carries out selection of a corresponding data block of the SRAM cache memory, control of the transfer circuit in transfer bus section 13, and data transfer to the processor.

In step S21, however, if received DRAM tag address DTG does not coincide with any tag address stored in DRAM tag memory 24a, DRAM hit indication signal DCH is inactivated. In this case, main memory transfer control circuit 24ba is activated, and DRAM tag address DTG is set as an initial value in burst address counter 24bb. When main memory transfer control circuit 24ba is activated, it instructs the externally provided control unit to transfer data and supplies DRAM tag address DTG to the control unit. Main memory transfer control circuit 24ba successively writes data supplied through the DRAM I/O unit to a memory cell addressed by the address signal from burst address counter 24bb (step S24).

Main memory transfer control circuit 24ba also monitors if the data of the DRAM cache block has all transferred according to a count value of a counter, not shown, or to an instruction of the external control unit (step S25). If all data of the DRAM cache block have been transferred, main memory transfer control circuit 24ba informs intercache transfer control circuit 24bc that necessary data of the DRAM cache block have been all transferred. Intercache transfer control circuit 24bc is activated in response to the indication that all data have been completely transferred, and it performs operations of steps S22 and S23. The data transfer operation from the DRAM cache memory to the SRAM cache memory and the processor is performed as described previously.

Figure 12:
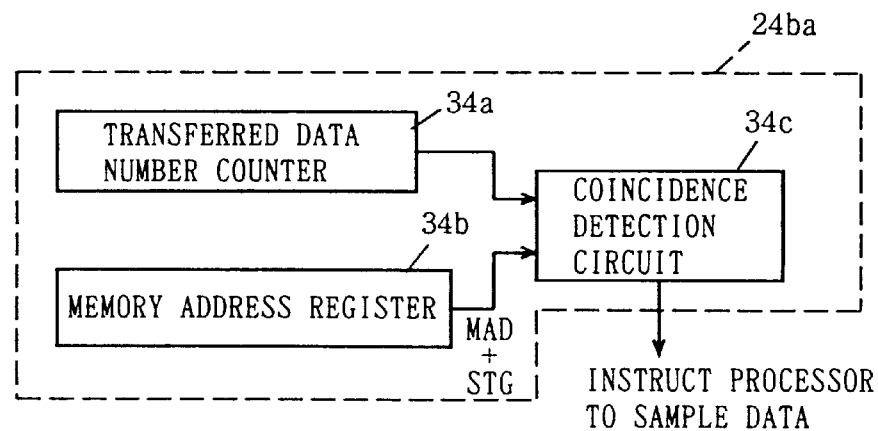
FIG. 12 schematically shows a structure of a processor data transfer section of the DRAM control unit shown in FIG. 3.

FIG. 12 schematically shows a structure of a processor data transfer control section contained in main memory transfer control circuit 24ba. In FIG. 12, main memory transfer control circuit 24ba includes, as the processor data transfer control section, a transferred data number counter 34a counting the number of data transferred through processor bus 11 and DRAM I/O unit 26, a memory address register 34b storing memory address MAD received from processor 10, and a coincidence detection circuit 34c detecting whether a count value of transferred data number counter 34a coincides with memory addresses MADs stored in memory address register 34b. When coincidence is detected, coincidence detection circuit 34c applies a data sampling instruction to processor 10, instructing processor 10 to incorporate data provided on processor bus 11.

When data is transferred from main memory 2 to DRAM cache memory 14, data is selected successively starting from a head address of the DRAM cache block designated by the DRAM tag address. In this case, a data location in the DRAM cache block is designated by a combination of addresses STG and MAD. Therefore, if a count value of transferred data number counter 34a corresponds to the combination of SRAM tag address STG and memory address MAD stored in memory address register 34b, it indicates that the data which the processor requests to access is supplied. When data is transferred from the main memory to the DRAM, the data which the processor requests to access is detected by coincidence detection of coincidence detection circuits 34c, so that data transfer to the processor 10 can be achieved simultaneously with data transfer to DRAM cache memory 14. It can shorten the wait time of processor 10.

The description above is based on data transfer from main memory 2 to DRAM cache memory 14 and that from DRAM cache memory 14 to SRAM cache memory 12. If a cache system performing what is called the "copy back" operation is used, however, data is transferred from SRAM cache memory 12 to DRAM cache memory 14 before data transfer from DRAM cache memory 14 to SRAM cache memory 12. Therefore, in order to copy data back when data is transferred from main memory 2 to DRAM cache memory 14, it is necessary to transfer data from SRAM cache memory 12 to DRAM cache memory 14 and from DRAM cache memory 14 to main memory 2. This structure is implemented by providing transfer circuit 13a of transfer bus section 13 as a bi-directional transfer circuit.

Figure 13:
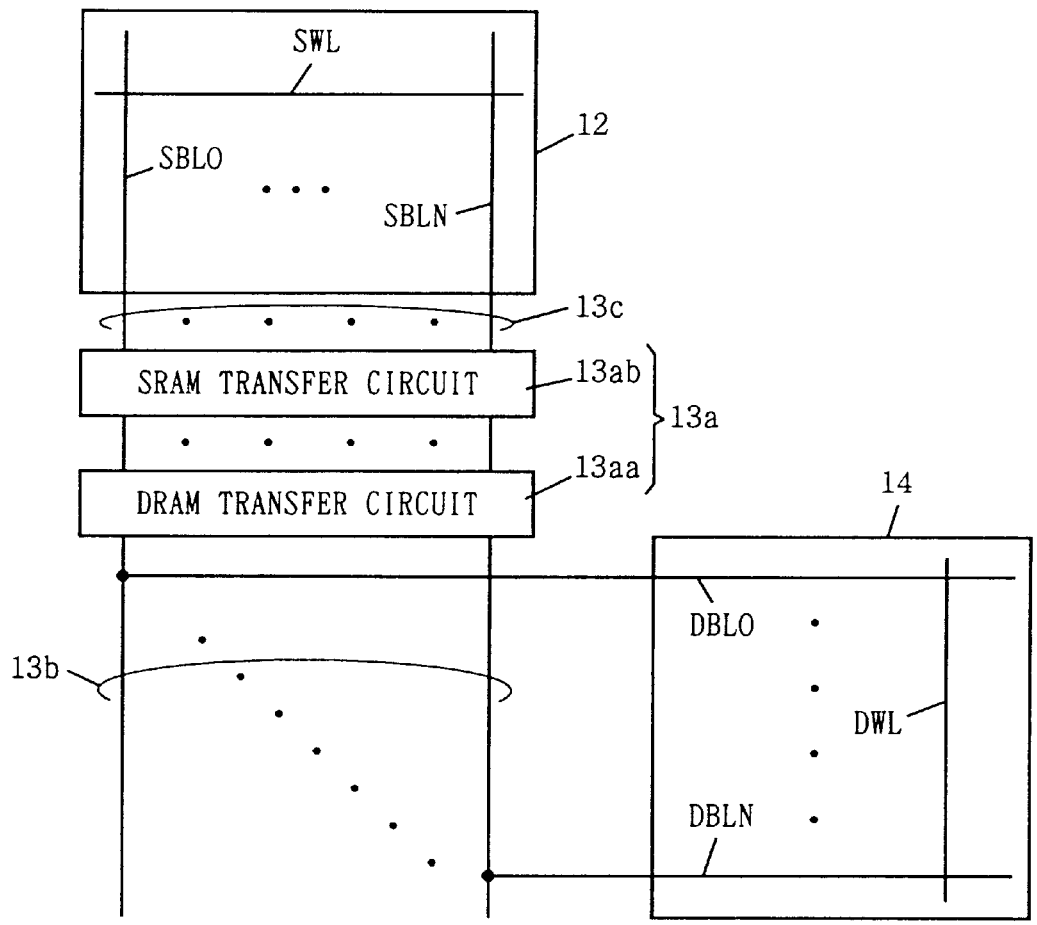
FIG. 13 schematically shows a structure of a data transfer section between the SRAM cache memory and the DRAM cache memory in the memory-contained processor in accordance with the present invention.

FIG. 13 shows a structure of a section for transferring data between SRAM cache memory 12 and DRAM cache memory 14. In FIG. 13, SRAM cache memory 12 includes a plurality of SRAM bit line pairs SBL0 to SBLN simultaneously selected and connected to internal transfer bus 13c. In FIG. 13, one SRAM word line SWL is representatively shown crossing SRAM bit line pairs SBL0 to SBLN.

DRAM cache memory 14 includes a plurality of DRAM bit line pairs DBL0 to DBLN simultaneously connected to internal transfer bus 13b. One DRAM word line DWL is representatively shown crossing these DRAM bit line pairs DBL0 to DBLN. Transfer circuit 13a includes a DRAM transfer circuit 13aa transferring data read on internal transfer bus 13b to the SRAM cache memory section, and an SRAM transfer circuit 13ab transferring the data transferred from DRAM transfer circuit 13aa to each one of SRAM bit line pairs SBL0 to SBLN in SRAM cache memory 12 through internal transfer bus 13c.

DRAM transfer circuit 13aa and SRAM transfer circuit 13ab include a bus driver and a latch circuit. DRAM transfer circuit 13aa has its operation controlled by the DRAM control unit (FIG. 3), and the operation of SRAM transfer circuit 13ab is controlled by the SRAM control unit (FIG. 3). Transfer circuits 13aa and 13ab may provide a function of transferring data bi-directionally (so as to implement the copy back or write through operation).

The number of SRAM bit line pairs SBL0 to SBLN and that of DRAM bit line pairs DBL0 to DBLN simultaneously coupled to internal transfer buses 13c and 13b, respectively, are determined by the SRAM cache block size.

Figure 14:
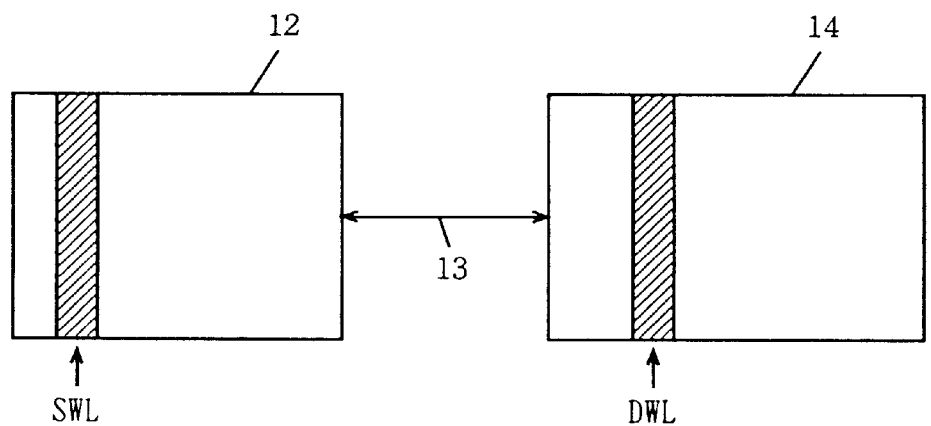
FIG. 14 schematically shows the correspondence between selected memory cells when data is transferred between cache memories according to the present invention.

FIG. 14 schematically illustrates transferred data between SRAM cache memory 12 and DRAM cache memory 14 during one cache miss data transfer. In FIG. 14, SRAM cache memory 12 has one SRAM word line SWL selected, and DRAM cache memory 14 has one DRAM word line DWL selected. Between memory cells connected to word lines SWL and DWL, data is transferred through transfer circuit 13. Therefore, in the structure shown in FIG. 14, the DRAM cache block includes DRAM cells connected to a plurality of DRAM word lines DWLs. In this case, the number of SRAM cells connected to one SRAM word line SWL equals to the number of DRAM cells connected to one DRAM word line DWL, and each of them forms one SRAM cache block.

Figure 15:
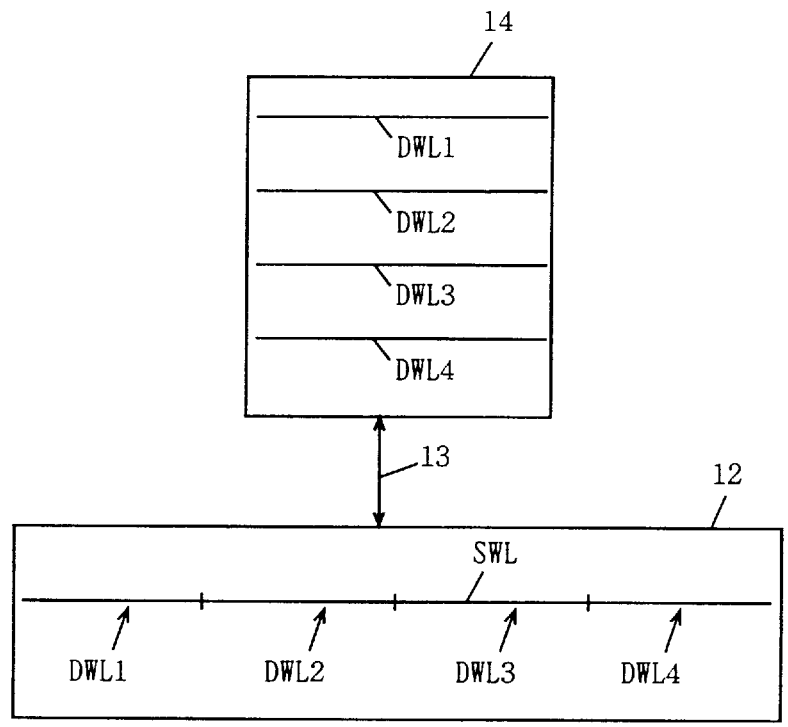
FIG. 15 schematically shows the correspondence between in-cache memory cells when data is transferred between cache memories.

FIG. 15 schematically shows another example of an SRAM cache block structure. In the structure shown in FIG. 15, DRAM cache memory 14 has four DRAM word lines DW1 to DW4 simultaneously selected, and memory cells connected to these DRAM word lines DW1 to DW4 are simultaneously coupled to internal transfer bus 13. In SRAM cache memory 12, one SRAM word line SWL is driven to the selected state. For this one SRAM word line SWL, data of memory cells connected to four DRAM word lines DWL1 to DWL4 is transferred. Therefore, in this structure, the size of one SRAM cache block corresponds to the number of memory cells connected to four DRAM word lines.

The structure in which a plurality of DRAM word lines are simultaneously driven to the selected state in DRAM cache memory 14 is achieved as described below. Normally, a DRAM is divided into blocks and a row decode circuit (row selection circuit) is provided for each block. Therefore, a plurality of blocks can simultaneously drive corresponding word lines to the selected state by their related row decode circuits. If there are A DRAM array blocks provided in DRAM cache memory 14, these array blocks are grouped every B memory array blocks. For each group, an internal transfer bus is provided having a bit width corresponding to the number of memory cells in one row (one word line). According to this structure, one word line can be selected in each group and data of a row of memory cells can be transferred to a corresponding internal transfer bus.

Instead of the structure shown in FIG. 15, data of memory cells on one DRAM word line can be transferred to a plurality of SRAM word lines. Since the SRAM cache memory operates more rapidly than the DRAM cache memory, it can successively drive SRAM word lines to the selected state according to data transfer of each section on the DRAM word line.

Unlike the structure shown in FIGS. 15 and 14, data does not need to be transferred on a word line basis. An appropriate structure based on the bus width of internal transfer bus 13 and the size of the SRAM cache block can be used.

Figure 16:
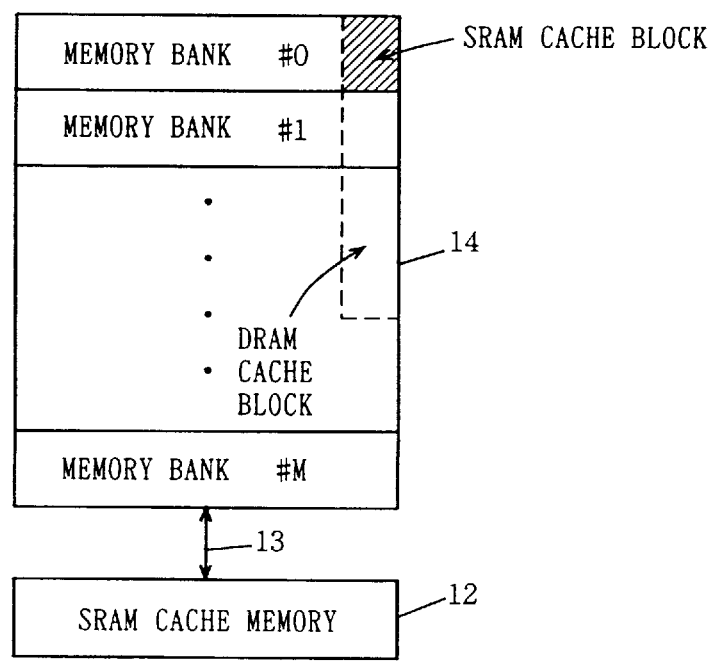
FIG. 16 schematically shows another structure of the DRAM cache memory.
Figure 17:
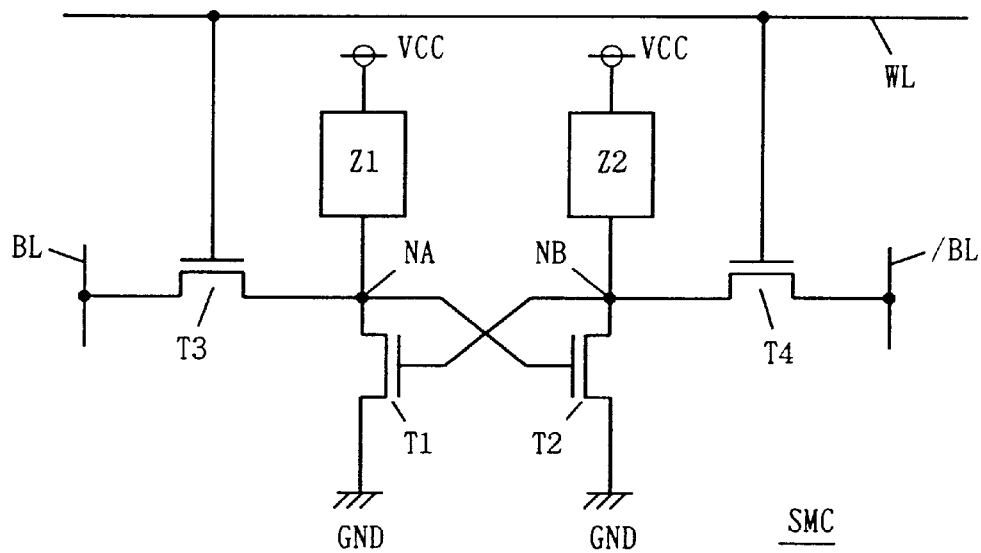
FIG. 17 schematically shows a structure of a conventional SRAM cell.

FIG. 16 shows another structure of the DRAM cache memory. In FIG. 16, DRAM cache memory 14 includes a plurality of memory banks #0 to #M each having the same storage capacity as SRAM cache memory 12. These memory banks #0 to #M can be driven to the active/inactive states independently from each other. That is, when a word line in one memory bank is selected, word lines in other memory banks can be driven from the selected state to the nonselected state, or from the non-selected state to the selected state. These memory banks #0 to #M are all connected in common to internal transfer bus 13.

In the structure shown in FIG. 16, each one of memory banks #0 to #M has the same storage capacity as SRAM cache memory 12. Therefore, one DRAM cache block is stored over a plurality of memory banks. One DRAM memory bank stores SRAM cache block data of different DRAM cache blocks. In this structure, DRAM tag address DTG includes a bank address. The structure of the DRAM tag address varies according to the number of banks and the sizes of the DRAM cache block and the SRAM cache block. When data is transferred from DRAM cache memory 14 to SRAM cache memory 12, one memory bank is selected, and an SRAM cache block in the one selected memory bank is selected and transferred to SRAM cache memory 12 through internal transfer bus 13. When data is transferred between main memory 2 and DRAM cache memory 14, the memory banks are activated in an interleaving manner. That is, when data transfer is performed from the main memory for one memory bank, another memory bank is driven to the selected state. It enables successive data transfer from the main memory to DRAM cache memory 14, reducing the penalty (wait time of the processor) in SRAM cache miss and DRAM cache miss.

In this bank structure, if an SRAM cache block containing the data which the processor requests to access is transferred to one memory bank during data transfer from main memory 2 to the memory bank, the SRAM cache block containing the requested data can be transferred from this bank to SRAM cache memory 12 through internal transfer bus section 13 and, at the same time, the remainder of the SRAM cache block data of the corresponding DRAM cache block can be transferred from main memory 2 to other memory banks, enabling high speed access.

In the description above, an SRAM is used as a high speed memory and a DRAM as a low speed and large storage capacity memory. However, any memory whose cell is constituted by different number of transistors and which is suitable for high integration can be used instead of the SRAM and the DRAM. In addition, data may be transferred bi-directionally.

As above, according to the present invention, a first memory capable of operating at high speed and a second memory, though operating at low speed, suitable to higher integration are provided as a cache memory inside a processor by interconnecting them through a transfer bus of a large bit width. It enables reduction in the data wait time of the processor in cache miss, and improves processing capability of the processor. The second memory which can be highly integrated enables a larger storage capacity of the cache without increasing the area of the memory-contained processor. By coupling the first and the second memories through the transfer bus of a large width, data can be transferred at high speed between these memories.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A memory-contained processor integrally formed on a same semiconductor chip, comprising:

an operational processor performing operational processing according to received data and instruction;

a first memory for storing information including the data and the instruction for said operational processor;

a second memory operating at a lower speed than said first memory, having a larger storage capacity than said first memory, and having fewer transistors contained in a memory cell than said first memory, for storing information for said operational processor;

a bus interconnecting said operational processor, said first memory and said second memory;

transfer means provided separately from said bus and having a larger bus width than said bus, for transferring information between said first memory and said second memory;

first control means determining if information which said operational processor requests to access is stored in said first memory, for transferring information between said operational processor and said first memory through said bus according to the determination; and second control means activated in response to the determination by said first control means that the information requested by said operational processor does not exist in said first memory, for determining if the requested information exists in said second memory, and for transferring information including the requested information between said first memory and said second memory through said transfer means when the determination indicates that said requested information exists in said second memory.

2. The memory-contained processor according to claim 1, further comprising means responsive to the determination by said second control means that said information which said operational processor requests to access does not exist in said second memory, for transferring information between said second memory and an externally provided memory through the said bus and transferring the requested information to said operational processor through said bus.

3. The memory contained processor according to claim 1, wherein said first memory includes a plurality of first memory cells arranged in rows and columns, and said second memory includes a plurality of second memory cells arranged in rows and columns, and wherein said transfer means includes a first sub transfer means coupled to a selected row of the first memory cells for communicating information therewith concurrently when activated, and a second sub transfer means coupled to at least selected row of the second memory cells for communicating information therewith concurrently when activated, and wherein said second control means includes means for activating said first sub transfer means and said second sub transfer means individually for transmission of information between said first memory and said second memory.

4. The memory-contained processor according to claim 3, wherein said second sub transfer means is coupled to a plurality of selected rows of the second memory cells concurrently.

5. The memory-contained processor according to claim 1, wherein said second memory includes a plurality of banks each activated and inactivated independently from others, and said transfer means is provided in common to said plurality of banks.

6. The memory-contained processor according to claim 5, wherein each of said plurality of banks has a same storage capacity as that of said first memory.

7. The memory-contained processor according to claim 5, further comprising means responsive to the determination by said second control means that the access-requested information does not present in said second memory, for transferring information including the access-requested information from an externally provided memory to a plurality of the banks such that said information including the access-requested information is stored over the plurality of the banks.

8. The memory contained process according to claim 7, wherein said transfer means includes means for transferring information between said first memory and a bank of said plurality of the banks in response to said second control means.

9. A memory-contained processor integrally formed on a same semiconductor chip, comprising:

an operational processor for performing operational processing according to received data and instruction;

a first memory for storing information including the data and the instruction for said operational processor;

a second memory operating at a lower speed than said first memory and having a larger storage capacity than said first memory, said second memory for storing information for said operational processor;

a first bus connecting said operational processor with said first memory;

a second bus having a larger bus width than said first bus, for transferring information between said first memory and said second memory;

a first memory control unit determining if information which said operational processor requests to access is stored in said first memory, for transferring information between said operational processor and said first memory through said first bus according to the determination; and a second memory control unit activated in response to the determination by said first memory control unit that the information requested by said operational processor does not exist in said first memory, for determining if the requested information exists in said second memory, and for transferring information including the requested information between said first memory and said second memory through said second bus when the determination indicates that said requested information exists in said second memory.

10. The memory-contained processor according to claim 9, further comprising:

an interface unit responsive to the determination by said second memory control unit that said information which said operational processor requests to access does not exist in said second memory, for transferring information between said second memory and an externally provided memory through the said first bus and transferring the requested information to said operational processor through said first bus.

11. The memory contained processor according to claim 9, wherein said first memory includes a plurality of first memory cells arranged in rows and columns, and said second memory includes a plurality of second memory cells arranged in rows and columns, and wherein said memory-contained processor further comprises:
a first sub transfer circuit coupled to a selected row of the first memory cells and to the second memory bus for communicating information therewith concurrently when activated, and
a second sub transfer circuit coupled to at least a selected row of the second memory cells and to the second bus for communicating information therewith concurrently when activated, and wherein said second memory control unit includes a transfer control circuit for activating said first sub transfer circuit and said second sub transfer circuit individually for transmission of information between said first memory and said second memory.

12. The memory-contained processor according to claim 11, wherein said second sub transfer circuit is coupled to a plurality of selected rows of the second cells concurrently.

13. The memory-contained processor according to claim 9, wherein said second memory includes a plurality of banks each activated and inactivated independently from others, and said second bus is provided in common to said plurality of banks.

14. The memory-contained processor according to claim 13, wherein each of said plurality of banks has a same storage capacity as that of said first memory.

15. The memory-contained processor according to claim 13, further comprising:

an interface unit responsive to the determination by said second memory control unit that the access-requested information does not exist in said second memory, configured to transfer information including the access-requested information from an externally provided memory to a plurality of the banks such that said information including the access-requested information is stored among the plurality of the banks.

16. The memory-contained process according to claim 15, wherein said interface unit is further configured to transfer information between said first memory and a bank of said plurality of the banks in response to said second control means.

* * * * *